Patented Sept. 2, 1924.

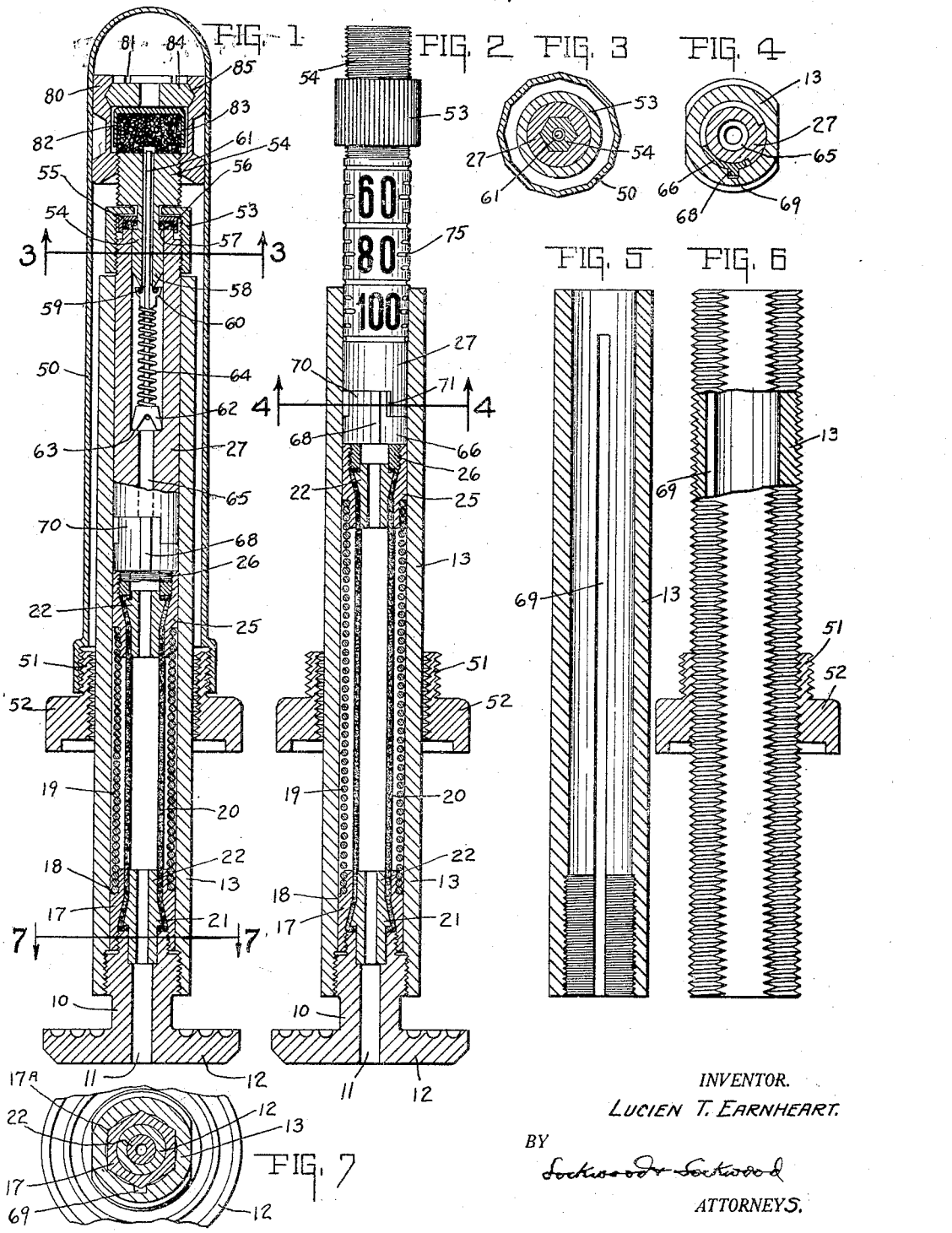

1,506,738

UNITED STATES PATENT OFFICE.

LUCIEN T. EARNHEART, OF SAUNEMIN, ILLINOIS, ASSIGNOR TO THE SAFETY FIRST DEVICES COMPANY, INC., OF INDIANAPOLIS, INDIANA, A CORPORATION.

AIR VALVE AND GAUGE.

Application filed September 18, 1922. Serial No. 588,890.

*To all whom it may concern:*

Be it known that I, LUCIEN T. EARNHEART, a citizen of the United States, and a resident of Saunemin, county of Livingston, and State of Illinois, have invented a certain new and useful Air Valve and Gauge; and I do hereby declare that the following is a full, clear, and exact description thereof, reference being had to the accompanying drawings, in which like numerals refer to like parts.

This invention is an improvement in pressure air indicating valves of the general construction and type set forth in previous Letters Patent granted to me December 7, 1920, No. 1,361,570, and Letters Patent granted to Chauncy B. Earnheart, Nos. 1,305,265 and 1,305,266. This invention includes certain improvements over the structures shown in said prior Letters Patent.

One feature of the present invention consists in providing means for permitting slight rotary movement of the gauge in order to bring the numerals to the front, and it also provides for the torsional movement when it is being forced outward by the air pressure after the cap has been removed. During such outward movement, the stretching of the spiral spring associated with the gauge causes the gauge to turn, and therefore, in this invention such torsional movement is provided for. It is desirable to have some freedom of torsional movement in the gauge, but not too much.

Another feature of this invention consists in a simple arrangement of the valve and one in which the valve can be released without the use of any instrument by merely providing the screw cap associated with the valve, whereby the valve can be secured in place or removed by merely turning the screw cap. This makes the manipulation of the valve much simpler for the automobile user. Furthermore, the valve is merely a metal member with a tapering end which fits against a yielding valve seat. There are no multiplicity of members in the valve construction to increase the expense of manufacture or trouble in its use.

Another feature of the invention consists in providing the device with an external cap twelve sided inside and out which contains an internal twelve sided slidable nut adapted to be screwed onto the outer end of the valve structure, and the cap is internally threaded at its open end to engage the rim nut on the casing so as to hold the cap at its inner limit of movement. The cap screws on the pushed in valve structure and said casing nut simultaneously. This is used in association with an indicating valve mechanism of the type herein shown, which is spring-held and which must be forced outward by the air pressure in the tire, in order to indicate the pressure and which must be held in its inner position by the external cap.

The full nature of the invention will be understood from the accompanying drawings and the following description and claims:

In the drawings, Figure 1 is a longitudinal section of the entire valve mechanism in its closed condition. Fig. 2 is the same as Fig. 1 with the cap removed and with the indicator forced outward. Fig. 3 is a cross section on the line 3—3 of Fig. 1. Fig. 4 is a section on the line 4—4 of Fig. 2. Fig. 5 is a central vertical section of the outer casing by itself in the position shown in Figs. 1 and 2. Fig. 6 is a side elevation of said outer casing showing the flat and threaded sides thereof. Fig. 7 is a section taken on the line 7—7 of Fig. 1.

There is shown in the drawings a short valve stem 10 with a central air passage 11 and a flange 12 on the lower end, whereby it is secured to the pneumatic tire by a clamp nut on the outer casing 13, said tire and clamp nut not being shown. The casing 13 is internally threaded at its lower end where it screws on the valve stem 10. The casing is externally threaded throughout its length, as shown in Fig. 6, but its two opposite sides are flattened throughout the length of the casing, as shown in Figs. 4 and 6.

The outer end of the short valve stem 10 is reduced somewhat in diameter, but not externally threaded. Over the reduced end of the stem 10 the spring holder 17 fits, the external surface of which is hexagonal and smooth, as seen in Fig. 7. The corners made by the hexagonal faces of the holder 17 enter the complementary V-shaped ways formed in the casing, as shown in Fig. 7. The spring holder 17 has a reduced upper portion, leaving an outer shoulder 18 which abuts against the overhanging portions of the casing 13 at the upper ends of the V-shaped ways. The spiral spring 19 surrounds the reduced portion of the spring holder 17 and abuts against the shoulder 18. Within the spiral spring, there is a flexible air-tight tube 20, the lower end of which projects into the spring holder 17 surrounding the conical and large portion 21 of the tubular metal union 22, which forms a connection between said flexible tube and the valve stem 10. The lower end of the union projects into a suitable seat formed in the upper part of the valve stem. The lower end of the flexible tube extends downwardly beyond the conical enlargement 21 and forms a gasket or washer extending inwardly beneath the reduced lower end of the union 22. The spring holder 17 has a complementary formed conical tubular enlargement in its inner surface to receive the conical enlargement 21 of the union 22 and the flexible tube 20. Therefore, when the casing 13 is screwed down on the valve stem 10, it forces the conical inner wall of the spring holder 17 down on the flexible tube 20 and makes an air-tight joint.

Around the upper end of the tube 20, there is another spring holder 25 which is vertically movable in the casing 13. Its lower end is reduced to extend into the spring 19. Both spring holders 25 and 17 are screwed to the ends of the spring 19 and cannot escape therefrom. Within the upper spring holder 25, there is another metal union 22 similar to that at the lower end for securing the upper end of the tube in place with an air-tight connection, as desired. Said upper spring holder 25 at its upper end is internally threaded to screw on the lower reduced threaded end 26 of a tubular gauge member 27.

The gauge member 27 is vertically slidable in the casing 13 and under air pressure will project beyond the outer end of the casing, as shown in Fig. 2, in proportion to the air pressure, and it is provided with indicating markers 75 and numerals 60, 80 and 100 being shown representing the pounds pressure of the air in the tire.

The spiral spring 19 is in its normal condition of tension when it is collapsed, as shown in Fig. 1, and it yieldingly resists the outward movement of the gauge tube 27 as the air under pressure from the tire tends to force the gauge tube outward.

The gauge tube is forced inward in the casing 13 and the spring 19 is compressed by an external cap 50 which is internally threaded at its lower end and screws on an externally threaded extension 51 of a nut 52, which screws on the casing 13. When a person desires to learn the air pressure in the tire, he unscrews the cap 50 and then the gauge member 27 is forced outward, as shown in Fig. 2, and the indicating line 75, which is just at the outer end of the casing 13, indicates to him the pressure of the air in the tire. As the device is shown in Fig. 2, it indicates substantially 80 pounds pressure. A nut 52 serves as the usual clamp nut for such devices.

Above the indicating portion of the gauge member 27, it is for a short distance externally threaded to receive an internally threaded cap nut 53. The upper end of the cap nut is contracted and has a central opening through which a valve stem tube 54 extends. The lower portion of said valve stem tube is hexagonal in cross section, as shown in Fig. 3, and is reduced in diameter in respect to the upper portion. Said lower portion extends down into the gauge member 27, and is prevented from turning therein by the hexagonal fit. Within the cap nut 53 there is located an inverted cup-shaped member 55 which is a part of the valve stem tube 54, and within said cup-shaped member 55, there is a rubber packing ring 56 that engages a shoulder 57 of the valve stem tube, so that an air tight seal is afforded by screwing the cap nut 53 down tightly against the cup-shaped member 55 and forcing it against a packing 56, and sealing against 57.

At the lower end of the valve stem tube 54 a conical valve seat 58 is located that is engaged by an annular rubber cushion 59 located in a valve 60. The valve 60 is secured midway on a valve stem 61 that extends through the valve stem tube 54 centrally and extends loosely through, as shown, and below the same and carries on its lower end loosely a head 62 which rests on a shoulder 63 in the gauge tube 27. A valve spring 64 is located on the valve stem 61 between the valve 60 and the head 62, so that the valve can be opened by pressing down on the top of the valve stem 61 which extends slightly above the upper end of the valve stem tube 54, as shown in Fig. 1.

The upper end of the valve stem tube 54 is enlarged having substantially the same diameter as the gauge tube, and it is adapted to receive the hose nipple through which air under pressure is introduced into the tire. The hose and hose nipple are not shown, but when the hose nipple is applied, it engages the upper end of the valve stem 61 and the air under pressure entering the valve construction will force the valve 60 open and admit the air which it passes through a central opening 65 of the gauge tube and central openings in the spring holders 25 and 17, the spring 19 and the stem 10. When the air supplying means is removed, the spring 64 will force the valve 60 closed and also the back pressure of the air will have that effect, and it is the main means for keeping the valve closed tightly.

A limiting sleeve 66 is mounted loosely on the lower end of the gauge 27 so it can be turned thereon and it has a vertical spline 68 adapted to enter and loosely slide in a keyway 69 in the inner wall of the casing 13, as shown in Fig. 5. Said sleeve 66 has a projection 70 that extends into a cut away portion of the gauge tube 27 which is laterally longer than the extension 70 so that the gauge tube can have rotary movement to a slight extent, stopped when one of the shoulders 71 on the gauge tube engages the extension 70 on the sleeve 66.

The limiting sleeve 66 associated with the other parts performs two or three functions. It is not rotatable at all, but it has sliding movement in the casing 13, and, therefore, vertically guides the associated parts including the gauge tube. But it does not hold the gauge tube entirely from rotary movement. This is to enable the gauge tube to be slightly turned one way or the other, when it is being read so that the figures will face the individual and be easily understood. Also the limiting sleeve 66 provides for the torsional movement of the gauge member due to the unwinding movement of the spiral spring 19 when it is being stretched, as shown in Fig. 2, while the gauge is being moved outward. Both of these functions of the sleeve 66 are important.

The valve cap is twelve sided inside and outside, and has an extension at its lower end 51 enlarged and threaded inside to screw on a rim nut 52 of a valve stem. There is a slidable nut 80 twelve sided which will just slip in the valve cap 50 and cannot turn in it. This slidable nut 80 is split at its upper end 81 longitudinally in two places part way through the nut 80 to allow the upper end to have a spring action. There is inserted in this nut 80 a cap 82 filled with packing 83 with the packing toward the lower end of the nut. A wedge-shaped metal washer 84 is pushed in to the upper end of the nut 80. Said nut has an annular recess or seat 85 to receive this wedge-shaped washer 84, and is then inserted in the cap 50, being threaded to screw on the upper end of the gauge valve stem 54. The valve cap 50 is reduced slightly after the nut 80 is inserted so that the nut cannot be pulled out of the cap. This reduction is just above the threaded portion of the cap at its outer end. The nut 80 is now in a position to slide up and down in the cap. Upon screwing the cap 50 on to a valve stem, the upper threaded portion of the valve stem 54 would screw into the nut 80 in the valve cap 50 and push upward on the packing 83 in the cup 82. Said cup in turn would push upward on the wedge-shaped washer 84 and cause the upper end of the nut to spread against the inner wall of the cap and the nut could not now be moved upward or downward in said cap. Said nut, however, would be sealed against the valve stem 54.

In using this valve cap on the gauge valve, the action is as follows: Beginning with the nut 80 close down to the outer end of the valve cap 50, and desiring to put it on the gauge valve as in Fig. 1, the tire being under pressure and the gauge member 27 extended, the cap is pushed on the gauge member 27. This causes the gauge member to move downward to its closed position in Fig. 1. Then the cap nut 80 slides upward in the cap 50 until the inner threaded part of the cap is ready to engage on the rim nut 52, said rim nut having previously been screwed on the valve casing 15 tightly against the wheel. It is easier to push the gauge member 27 down against compression than to push the cap nut 80 up in the cap. The cap 50 is then ready to be screwed on. The air pressure in the tire is holding the end 54 of the gauge member 27 tight against the threaded portion of the slidable nut 80 in the cap 50. The cap is screwed on to the valve stem tube 54 and also on to the threaded part 51 of the rim nut 52 at the same time. The rim nut 52 is so threaded that the slidable nut 80 becomes tight on the valve stem tube 54 before the cap 50 is fully screwed down on the rim nut 52. The cap nut 80 has now sealed the upper end of the valve stem 54 and the internally threaded lower end of the dust cap 50 being screwed on to the rim nut 52 prevents the gauge member lifting the cap 50 outwards from the casing 15. In this position the rim nut 52 holds the cap 50 firmly. The slidable cap nut 80 has pushed the gauge member 54 down to its inner position and also said nut 80 has sealed the gauge member 54 at its outer end and has become sealed in the cap 50.

It will be noted by this description that the slidable nut in the cap will adjust itself at the right time. The position it has in the cap 50 will depend upon the distance it moves to allow the outer internally threaded end of the cap 50 to be in position to screw on the rim nut 52. Thus the slidable nut will be in different positions on different valve stems, depending upon the amount of the valve stem extending upward from the rim nut which will vary in different tires. When the valve cap 50 is unscrewed, the slidable nut 80 remains in the position it now is in, thus the cap is adjusted to this particular tire. The nut 80 is now loosely held in the cap 50, but can easily be adjusted to a new position in the cap if it is desirable to do so. One easy way to do this is to slip the cap 50 on the valve stem of the spare tire until it engages the stem slightly and pulls the nut 80 downward toward the open end 50.

The operation of this valve mechanism is very convenient and simple. The cap 50 is removed and then the gauge tube will be forced outward to indicate the air pressure in the tire. If it is desirable to fill the tire, an air supply tube is applied to the outer end of the valve structure, the part 54, until the gauge tube indictes the desired air pressure in the tire. Then the cap is put on the valve structure and forced inward as far as possible and when it is turned as far as possible, it will cause all the parts to be in their proper position. If it be desired to remove the valve, all that is necessary is to turn the part 53, shown in Fig. 2, and unscrew it from the gauge tube 27 and then lift out the cap screw and part 54 which would leave the valve stem 61 protruding and that can be lifted out by the fingers and thus the valve be removed. In replacing the valve, the valve proper with the valve stem 61 is introduced into the gauge tube and then the part 54 is placed over the valve stem and the cap screwed down on the gauge tube. No extra tool is required, therefore, to remove or replace the valve.

The invention herein is not limited to the particular construction shown and described or the means for holding and withdrawing the valve portion of the device, as such construction and arrangement is equally applicable to the ordinary air pressure valve structure heretofore old in the art, whereby the valve can be removed by the fingers unscrewing the cap nut 53, instead of using an instrument.

The invention claimed is:

1. In a pressure indicating air valve structure, a fixed valve casing, a spring-withheld air-pressure gauge slidable in said casing, and means for limiting the torsional movement of the gauge and yet permitting some torsional adjustment of the gauge.

2. In a pressure indicating air valve structure, a fixed valve casing, a spring-withheld air-pressure gauge slidable in said casing, and non-rotatable means slidably mounted in said casing for limiting the torsional movement of said gauge.

3. In a pressure indicating air valve structure, a fixed valve casing, a spring-withheld air-pressure gauge slidable in said casing having at its inner end a peripheral notch, and a sleeve splined in said casing with an extension into said notch so as to permit limited torsional movement of said gauge.

4. In a pressure indicating air valve structure, a fixed valve casing with a longitudinal groove therein, an air-pressure indicating tube slidable in said casing, a spiral spring fixedly held at the inner end of the valve stem and connected with said gauge to permit the gauge to move outward under air pressure, and a sleeve slidable in said casing with a spline projecting into said groove and having a projection toward said gauge, said gauge being peripherally recessed to receive said extension and said recess being wider than said extension whereby the gauge will have a limited torsional movement.

In witness whereof, I have hereunto affixed my signature.

LUCIEN T. EARNHEART.